A. E. SMITH.
FRONT FASTENING DEVICE FOR VEHICLE TOPS.
APPLICATION FILED SEPT. 1, 1909.
979,893.
Patented Dec. 27, 1910.
2 SHEETS—SHEET 1.
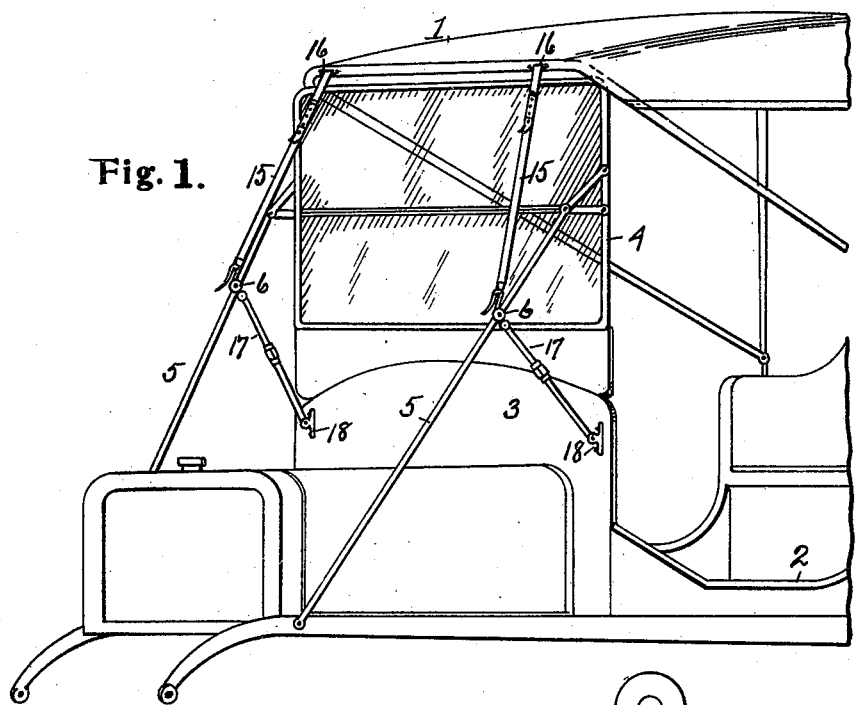
Fig. 1.
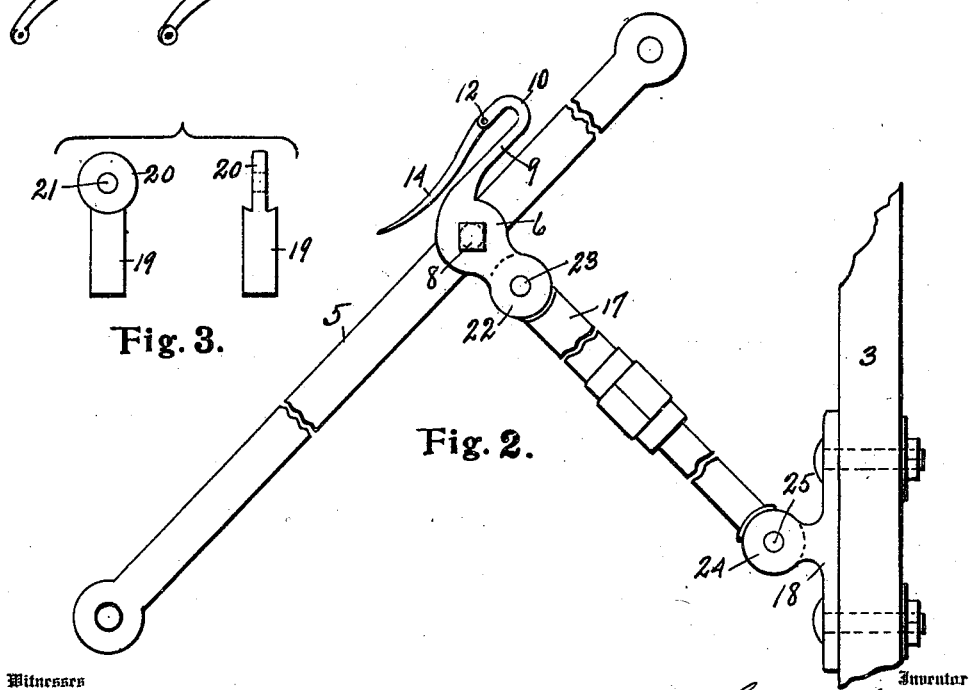
Fig. 3.
Fig. 2.
Witnesses
O. B. Baenziger.
J. G. Howlett.
Inventor
Albert E. Smith.
By T. A. Wheeler & Co.
Attorneys A. E. SMITH.
FRONT FASTENING DEVICE FOR VEHICLE TOPS.
APPLICATION FILED SEPT. 1, 1909.
979,893.
Patented Dec. 27, 1910.
2 SHEETS—SHEET 2.
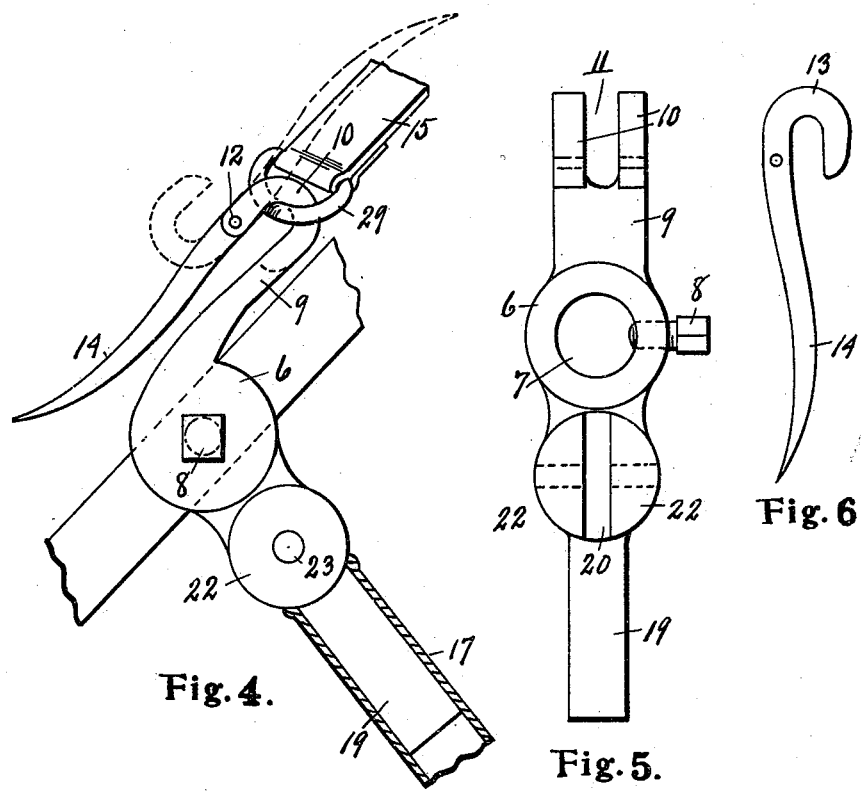
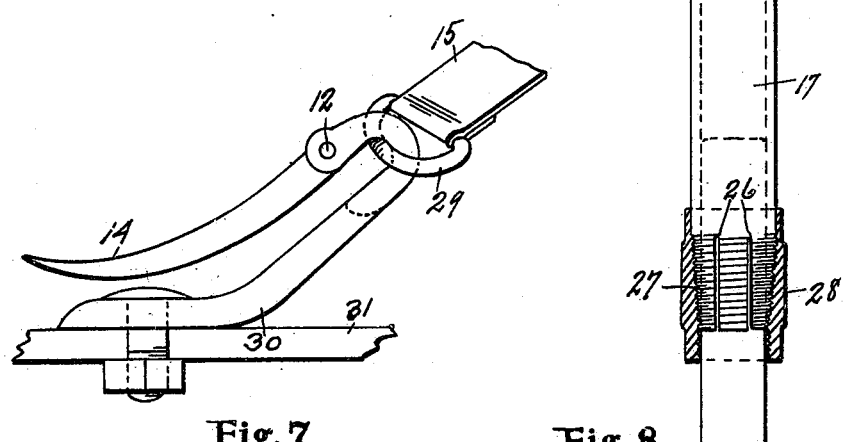

UNITED STATES PATENT OFFICE.

ALBERT E. SMITH, OF DETROIT, MICHIGAN, ASSIGNOR OF ONE-HALF TO LEONARD A. YOUNG, OF DETROIT, MICHIGAN.

FRONT FASTENING DEVICE FOR VEHICLE-TOPS.

979,893. Specification of Letters Patent. Patented Dec. 27, 1910.

Application filed September 1, 1909. Serial No. 515,560.

*To all whom it may concern:*

Be it known that I, ALBERT E. SMITH, a citizen of the United States, residing at Detroit, in the county of Wayne, State of Michigan, have invented certain new and useful Improvements in Front Fastening Devices for Vehicle-Tops; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a front fastening device for vehicle tops, especially designed for use upon automobiles, and consists in the construction and arrangement of parts hereinafter more fully set forth and pointed out particularly in the claims.

The object of the invention is to provide simple and efficient means for fastening the forward ends of the guy or brace straps attached to the front of an automobile top, either to the frame of the vehicle or to the brace rod of the wind shield, in a manner to enable said straps to be quickly and securely fastened and readily and easily unfastened, when desired, the arrangement being such as to relieve the strap and top from excessive strain during the operation of fastening and unfastening, thereby avoiding injury to the top.

The above object is attained by the structure illustrated in the accompanying drawings, in which:—

Figure 1 is a perspective view of the front end of the frame and body of an automobile with a top thereon, showing the application of my fastening device for attaching the front stay straps of the top to the wind shield braces. Fig. 2 is an enlarged fragmentary view in elevation of the fastening device mounted on the wind shield brace rod and connected by a telescopic brace rod with a bracket on the dash. Fig. 3 is an elevation of one of the members employed to make a jointed connection between the ends of the telescopic brace and the brackets on the dash, and on the wind shield brace rod, respectively. Fig. 4 is an enlarged fragmentary view, showing the pivoted hook carried by the bracket on the wind shield brace rod engaging the ring in the end of the front brace or guy strap. Fig. 5 is an elevation of the bracket adapted to be mounted on the wind shield brace rod with the hook removed. Fig. 6 is an elevation of the hook adapted to be pivotally mounted in the bracket shown in Fig. 5. Fig. 7 shows a modification of the bracket illustrated in Fig. 5, to enable said bracket to be attached directly to the frame of the vehicle instead of to the wind shield brace rod. Fig. 8 is a fragmentary view in section illustrating the telescopic joint employed in the lateral brace to connect the wind shield rod with the dash.

Referring to the characters of reference, 1 designates an automobile top suitably mounted upon a body 2 having upon the dash 3 thereof a wind shield 4 braced by the downwardly extending rods 5, all of which parts are of common construction. Mounted upon said brace rods are the brackets 6, each of which is provided with an aperture 7 through which the rod 5 passes, whereby said brackets become slidably mounted upon said rods. To enable said brackets to be locked to said rods when properly adjusted thereon, they are each provided with a set-screw 8. Each of the brackets 6 is also provided with an extended portion 9 having a return bend 10, said bent portion being slotted as shown at 11 in Fig. 5. Lying in said slot and pivoted at 12 between the sides of the bent portion 10 of the extension of said bracket is a hook 13 which coincides with the bent portion 10 when the parts are in their normal position, said hook having an end portion 14 which extends some distance from its point of pivot to afford the necessary leverage for manipulating the hook when carrying the strain of the brace strap.

In all cases where the vehicle is equipped with a wind shield, as shown in Fig. 1, the brace straps 15 instead of being sufficiently long to extend downwardly and forwardly to the front end of the frame for attachment, as commonly practiced, need only be of such length as to extend from the front of the top to which they are suitably attached, as shown at 16, to the brackets 6 mounted on the rods 5 near their upper ends, as shown. In order to prevent the rods 5 being sprung or drawn out of alinement by the strain of the straps 15, and to provide a firm attachment for the forward ends of said straps, the lateral braces 17 are employed which extend between the brace rods 5 of the wind shield and the dash, said braces being coupled at their outer ends to the brackets 6 and at their inner ends to the dash brackets 18. To effect a jointed connection between the ends of the braces 17 and said brackets, said braces, which are hollow, are provided at each end with a coupling member 19 adapted to be brazed or otherwise secured in the ends of said braces and having a flat circular extension 20 provided with a central aperture 21. The circular extensions 20 of the members 19 in the outer ends of the braces 17 are adapted to lie between the projecting ears 22 on the bracket 6, as clearly shown in Fig. 5, between which said parts are pivoted by the pivot pins 23. At the opposite ends of the braces 17 the flat portions of the coupling members 19 lie between the ears 24 of the dash brackets 18, between which said parts are pivoted by the pins 25. By this arrangement the braces 17 are jointedly connected with the brackets on the dash and the slidable brackets on the rods 5, enabling the rod brackets 6 to be moved to any desired point thereon to suit the length of the straps 15. As the distance between the pivotal points 25 of the braces 17 and the points of attachment between said braces and the brackets 6 varies according to the position of the brackets 6 upon the rods 5, it is necessary to make the braces 17 telescopic, and also to provide for locking the telescopic joint securely after adjustment. This is accomplished by making the upper tubular portion of the brace larger to receive the end of the lower portion which slides therein, the end of the upper portion being split, as at 26, and provided with a tapered thread 27 to receive an internally tapered and correspondingly threaded sleeve 28. Said sleeve when screwed onto the threads of the slotted portion of said brace will contract said slotted portion upon the lower part of the brace lying therein and lock the two sections of the brace together. By loosening the sleeve 28 the parts of the brace will be released, allowing one part to slide within the other to adjust the brace to any desired length. After adjustment the parts of the brace may be securely locked together by screwing the sleeve tightly onto the end of the slotted part.

The ends of the straps 15 are provided with rings 29. To fasten the ends of the straps to the brackets 6 upon the rods 5, the hooks 13 are swung on their pivots so that their shanks or projecting ends 14 will extend rearwardly, as shown by dotted lines in Fig. 4, allowing the rings 29 at the ends of the straps to be slipped over the free ends of said hooks, when said hooks are swung forwardly on their pivots, thereby drawing said rings into the return bends 10 in the extensions 9 of the brackets 6, the bent portion of the hook 13 at the completion of said operation conforming to said return bends and lying in the slot between the sides thereof. As the portion of the hook engaged by the ring in the strap is rearward of the point of pivot of said hook, the strain exerted upon the hook by said strap will only tend to hold the hook closed, thereby preventing the accidental disengagement of the ring therefrom. The long shank or end 14 of the hook affords sufficient leverage to enable the hook to be readily swung upon its pivot from the position shown by dotted lines in Fig. 4 to the position shown by solid lines in said figure to carry the ring of the strap into the bend 10 of the extension of the bracket 6 under such tension as to prevent accidental disengagement thereof. When it is desired to uncouple the strap or disconnect it from the bracket 6, it is only necessary to swing the end 14 of the hook rearwardly to carry the ring in the strap free from the bend 10, when said ring will pass from the open end of the hook, affording a ready means for disconnecting the straps.

In cases where a wind shield is not employed, it will be necessary to carry the straps 15 forwardly and downwardly to the front end of the vehicle frame. Under such conditions the brackets 6 are dispensed with and the modified brackets 30, shown in Fig. 7, employed, which are bolted to the frame 31, but which in other respects are the same as the sliding brackets 6 illustrated in the other views, the operation of attaching the strap thereto being the same as that already described.

It will be noted that when the fastening device is used in connection with the brace rods of a wind shield, the lateral braces 17 which are employed, take the strain off of the wind shield brace rods and afford a secure fastening for the ends of the straps, said fastening parts being adjustable to compensate for any variation in the distance between the points of attachment.

Having thus fully set forth my invention, what I claim as new and desire to secure by Letters Patent, is:—

1. A front top fastener, comprising a flexible member attached to the top and having a ring at its end, an inclined brace, a slidable bracket mounted thereon and having a hooked extension adapted to engage said ring, a hook pivotally mounted on said hooked extension to coincide therewith and lie in the plane thereof, said hook being adapted to receive the ring on said strap and confine said ring in the hooked extension of the bracket.

2. The combination with an automobile top, of a wind shield brace, a bracket movably mounted on said brace, to slide longitudinally, a fastening device carried by said bracket, and a strap attached to the top and detachably connected to said fastening device.

3. The combination of an automobile top, a wind shield brace rod, a bracket slidable on said brace rod, a strap attached to the top and detachably coupled to said bracket, and a lateral brace connected at one end with said brace rod, and at the other end with a fixed support.

4. A front fastening for an automobile top, comprising a strap attached to said top and having a ring at the end thereof, a wind shield brace rod, a bracket slidable upon said rod, a member on said bracket adapted to detachably engage the ring on said strap, and a lateral brace connected to said bracket.

5. A front fastening for an automobile top comprising a strap attached to said top, a wind shield brace rod, a bracket slidable upon said rod and adapted to be fixedly secured thereto, means for detachably connecting the end of said strap to said bracket, and a lateral telescopic brace connected to said bracket and to a fixed support.

6. A front fastening for an automobile top, comprising an inclined brace rod, a bracket adjustably mounted thereon, a relatively short strap attached to the front of said top, means for detachably connecting the end of said strap to said bracket, and a lateral brace adjustable in length connecting said bracket to a fixed support.

7. A front fastening for an automobile top, comprising a wind shield brace, a relatively short strap attached at one end to the automobile top and having at the other end an engageable member, and a fastening device comprising a hooked bracket adjustably mounted on said brace rod and engaged by the engageable member on said strap.

8. A front fastening for an automobile top, comprising an inclined brace rod, a relatively short strap attached to the front of the top, means for detachably connecting said strap to said brace rod, and a lateral brace connecting said brace rod to a fixed support.

In testimony whereof, I sign this specification in the presence of two witnesses.

ALBERT E. SMITH.

Witnesses:
   O. B. BAENZIGER,
   I. G. HOWLETT.